US006827397B1

(12) United States Patent
Driver

(10) Patent No.: US 6,827,397 B1
(45) Date of Patent: Dec. 7, 2004

(54) ADJUSTABLE BICYCLE SEAT

(76) Inventor: Burch Driver, 855 S. Los Robles Ave., Pasadena, CA (US) 91106

( * ) Notice: Subject to any disclaimer, the term of this patent is extended or adjusted under 35 U.S.C. 154(b) by 0 days.

(21) Appl. No.: 10/638,741

(22) Filed: Aug. 10, 2003

(51) Int. Cl.$^7$ ................................................. B62J 1/00
(52) U.S. Cl. ............................ 297/215.14; 297/215.15
(58) Field of Search ............................ 297/195.1, 201, 297/202, 215.13, 215.14, 215.15

(56) References Cited

U.S. PATENT DOCUMENTS

| | | | |
|---|---|---|---|
| 491,578 A | | 2/1893 | Mercer |
| 537,376 A | * | 4/1895 | Wright ..................... 297/201 |
| 572,273 A | * | 12/1896 | Peterson ............... 297/215.14 |
| 584,637 A | * | 6/1897 | Jarvis ..................... 297/202 |
| 585,858 A | | 7/1897 | Wooster |
| 604,347 A | * | 5/1898 | Bray ..................... 297/201 |
| 807,749 A | | 12/1905 | Ledig |
| 3,302,970 A | | 2/1967 | Rizzato |
| 3,408,090 A | | 10/1968 | Fritz |
| 3,858,906 A | | 1/1975 | Wright |
| 3,891,333 A | | 6/1975 | Corderack |
| 3,930,495 A | | 1/1976 | Marino, Jr. |
| 4,099,769 A | | 7/1978 | Jacobs |
| 4,103,966 A | | 8/1978 | Allen |
| 4,108,462 A | | 8/1978 | Martin |
| 4,155,590 A | | 5/1979 | Cunningham |
| 4,230,046 A | | 10/1980 | Smart |
| 4,231,611 A | | 11/1980 | Bird |
| 4,417,745 A | | 11/1983 | Shomo |
| 4,421,357 A | | 12/1983 | Shimano |
| 4,429,915 A | | 2/1984 | Flager |
| 4,568,121 A | | 2/1986 | Kashima |
| 4,653,808 A | | 3/1987 | Opsvik |
| 4,693,627 A | | 9/1987 | Borromeo |
| 4,733,907 A | | 3/1988 | Fellenbaum |
| 4,772,069 A | | 9/1988 | Szymski |
| 4,773,705 A | | 9/1988 | Terranova |
| 4,783,119 A | | 11/1988 | Moses |
| 4,836,604 A | | 6/1989 | Romano |
| 4,909,522 A | | 3/1990 | Flanigan |
| 4,915,538 A | | 4/1990 | Golden |
| 4,919,378 A | | 4/1990 | Iwasaki et al. |
| 4,952,439 A | | 8/1990 | Hanson |

(List continued on next page.)

FOREIGN PATENT DOCUMENTS

| | | |
|---|---|---|
| DE | 1282504 | 11/1968 |
| FR | 2436061 | 4/1980 |
| FR | 2589120 | 4/1987 |
| FR | 2675459 | 10/1992 |
| GB | 280469 | 11/1927 |
| WO | WO 9403357 | 2/1994 |

OTHER PUBLICATIONS

Jenson USA, Printout From Website of www.JensonUSA.com, Jul. 18, 2003, 4 pages.
Fogdog Sports, Printout From Website of www.Fogdog.com. Jul. 18, 2003, 2 pages.
Buy.com, Printout From Website of www.Buy.com, Jul. 18, 2003, 3 pages.
Bestbikebuys, Printout From Website of www.bestbikebuys.com, Jul. 18, 2003, 25 pages.
Images of bicycle seat saddles and seatposts from Internet Websites, on or about Jun. 2003 (29 pg.).

*Primary Examiner*—Peter R. Brown
(74) *Attorney, Agent, or Firm*—Law Office of David Hong

(57) ABSTRACT

An adjustable bicycle seat, which comprises a seat, a locking system, and a boom, allows for simultaneous longitudinal and angular adjustment of the seat position, when user is using the seat and with one hand. The locking system comprises a locking mechanism, friction lock, and release lever; the locking system relies on friction to keep the seat in a locked position until the user applies pressure to the releasing lever to unlock the locking system and to move the seat to a desired second position.

7 Claims, 12 Drawing Sheets

U.S. PATENT DOCUMENTS

| | | |
|---|---|---|
| 4,978,167 A | 12/1990 | Harvey |
| 5,007,675 A | 4/1991 | Musto et al. |
| 5,024,413 A | 6/1991 | Papp |
| 5,044,648 A | 9/1991 | Knapp |
| 5,048,891 A | 9/1991 | Yach |
| 5,074,618 A | 12/1991 | Ballard |
| 5,083,772 A | 1/1992 | Brown |
| 5,094,424 A | 3/1992 | Hartway |
| 5,121,962 A | 6/1992 | Weber et al. |
| 5,147,685 A | 9/1992 | Hanson |
| 5,190,346 A | 3/1993 | Ringle |
| 5,244,301 A | 9/1993 | Kurke et al. |
| 5,252,373 A | 10/1993 | Ganske et al. |
| 5,330,249 A | 7/1994 | Weber et al. |
| 5,364,160 A | 11/1994 | Fritschen et al. |
| 5,383,706 A | 1/1995 | Chen |
| 5,419,612 A | 5/1995 | Rassekhi |
| 5,441,327 A | 8/1995 | Sanderson |
| 5,466,042 A | 11/1995 | Herman |
| 5,509,751 A | 4/1996 | Keller |
| 5,513,895 A | 5/1996 | Olson et al. |
| 5,529,326 A | 6/1996 | Hwang |
| 5,571,273 A | 11/1996 | Saarinen |
| 5,586,780 A | 12/1996 | Klein et al. |
| 5,597,202 A | 1/1997 | Andersen |
| 5,664,829 A | 9/1997 | Thomson et al. |
| 5,676,420 A | 10/1997 | Kuipers et al. |
| 5,695,241 A | 12/1997 | Olsen et al. |
| 5,709,430 A | 1/1998 | Peters |
| 5,829,733 A | 11/1998 | Becker |
| 5,890,760 A | 4/1999 | Kirstein |
| 5,915,784 A | 6/1999 | Clark |
| 5,927,802 A | 7/1999 | Kesinger |
| 5,938,278 A | 8/1999 | Langevin |
| 5,979,978 A | 11/1999 | Olsen et al. |
| 5,988,741 A | 11/1999 | Voss et al. |
| 6,010,188 A | 1/2000 | Yates |
| 6,073,949 A | 6/2000 | O'Hare |
| 6,074,002 A | 6/2000 | Hansen |
| 6,079,775 A | 6/2000 | Lawson |
| 6,095,611 A | 8/2000 | Bar et al. |
| 6,135,550 A | 10/2000 | Tucho |
| RE36,970 E | 11/2000 | Keller |
| 6,174,027 B1 | 1/2001 | Lemmens |
| 6,390,548 B1 | 5/2002 | Cole |
| 6,554,355 B2 | 4/2003 | Kaptur |
| 2001/0006301 A1 | 7/2001 | Faltings |
| 2001/0045765 A1 | 11/2001 | Nelson |
| 2002/0053818 A1 | 5/2002 | Williams |
| 2002/0067059 A1 | 6/2002 | Kaptur |
| 2002/0069464 A1 | 6/2002 | Welsh |
| 2002/0093230 A1 | 7/2002 | Bigolin |
| 2002/0096917 A1 | 7/2002 | Turudich |
| 2002/0117880 A1 | 8/2002 | Ladson |
| 2002/0139905 A1 | 10/2002 | Duncan |
| 2002/0185581 A1 | 12/2002 | Trask |
| 2003/0038515 A1 | 2/2003 | Martin |
| 2003/0080594 A1 | 5/2003 | Geyer |
| 2003/0146651 A1 | 8/2003 | Wu |

* cited by examiner

ADJUSTABLE BICYCLE SEAT

BACKGROUND

An adjustable bicycle seat has ability for both longitudinal and angular adjustment during the use of the seat and with only one hand.

The main difficulty in current bicycle seats is the pressure placed on the rider's rear anatomy, i.e. other parts other than the ischium bones. The current products on the market have seats that place pressure on other parts of the rider's rear anatomy, which can cause great discomfort, injury, and/or nerve damage during use, especially during long bike rides.

Further, current bicycle seats do not provide for adjustment along both a longitudinal and angular pattern to maximize the efficiency of the rider as a power plant during all phases of bike riding, especially allowing for one hand adjustment during the bicycle use.

Also, much of the injury to the rear anatomy of a bicycle rider is from the constant wear and tear of the body moving, rubbing, or chafing against the bicycle seat. Current bicycle seats do not move with the rider and expose the rider to unnecessary the wear and tear on the rider's rear and posterior anatomy.

It is apparent that the current bicycle seats being used have significant disadvantages. Thus important aspects of the technology used in this field of invention remain amenable to useful refinement.

SUMMARY

The present invention is directed to an adjustable bicycle seat. This adjustable bicycle seat allows for both angular and longitudinal (front and back and back to front) adjustment, which can be done with one hand and simultaneously during use of the bicycle and/or vehicle.

This present invention improves on "adjustment on the fly" or during use of the bicycle and/or vehicle by providing a simple and elegant mechanism to allow for both longitudinal and angular adjustment.

The present invention also reduces or eliminates the wear and tear on the rear anatomy of a rider by allowing the seat to move with the rider at times when normally the rider would be moving back and forth independently of the seat. In addition, this invention also allows for quick adjustment and adaptability of the seat at different stages of riding and conditions, for example climbing hills, racing straights, declines, inclines, sprints, or time trials.

A longitudinally and angularly adjustable bicycle seat supported on a seat post comprising: a seat having at least one seat contact surface; said at least one seat contact surface engaging a bearing bracket; said bearing bracket further slidably engaging a channel of a boom; said at least one seat contact surface being fixedly attached to a locking mechanism; said locking mechanism frictionally engaging a friction lock within said boom; said friction lock securely attached to said boom; said locking mechanism and said seat providing an opposite force to said friction lock; a releasing lever pivotally mounted to said boom; said boom securely attached to said seat post; whereby said locking mechanism and said friction lock are frictionally engaged so that said seat is in a first locked position until a user applies a releasing force to said releasing lever to overcome said frictional force between said friction lock and said locking mechanism to allow said seat to move to at least one second unlocked position; whereby said user relinquishes said releasing force to said releasing lever and said friction lock and said locking mechanism frictionally engages and prevent said seat from moving.

The bicycle seat's friction lock is integrated into said boom. The bicycle seat's bearing bracket is integrated into said seat contact surface. The locking mechanism has at least one locking mechanism contact surface; said friction lock has at least one friction lock contact surface; whereby at said first locked seat position, said at least one locking mechanism contact surface and said at least one friction lock contact surface engage frictionally so that said seat does not move. The seat is fixably attached to said locking mechanism with at least one screw. The seat has at least one hole. The at least one contact surface of the bicycle seat has at least one seat pad.

The present invention introduces such refinements. All of the foregoing operational principles and advantages of the present invention will be more fully appreciated upon consideration of the following detailed description, with reference to the appended drawings.

DESCRIPTION OF THE PREFERRED EMBODIMENTS

Figure 1:
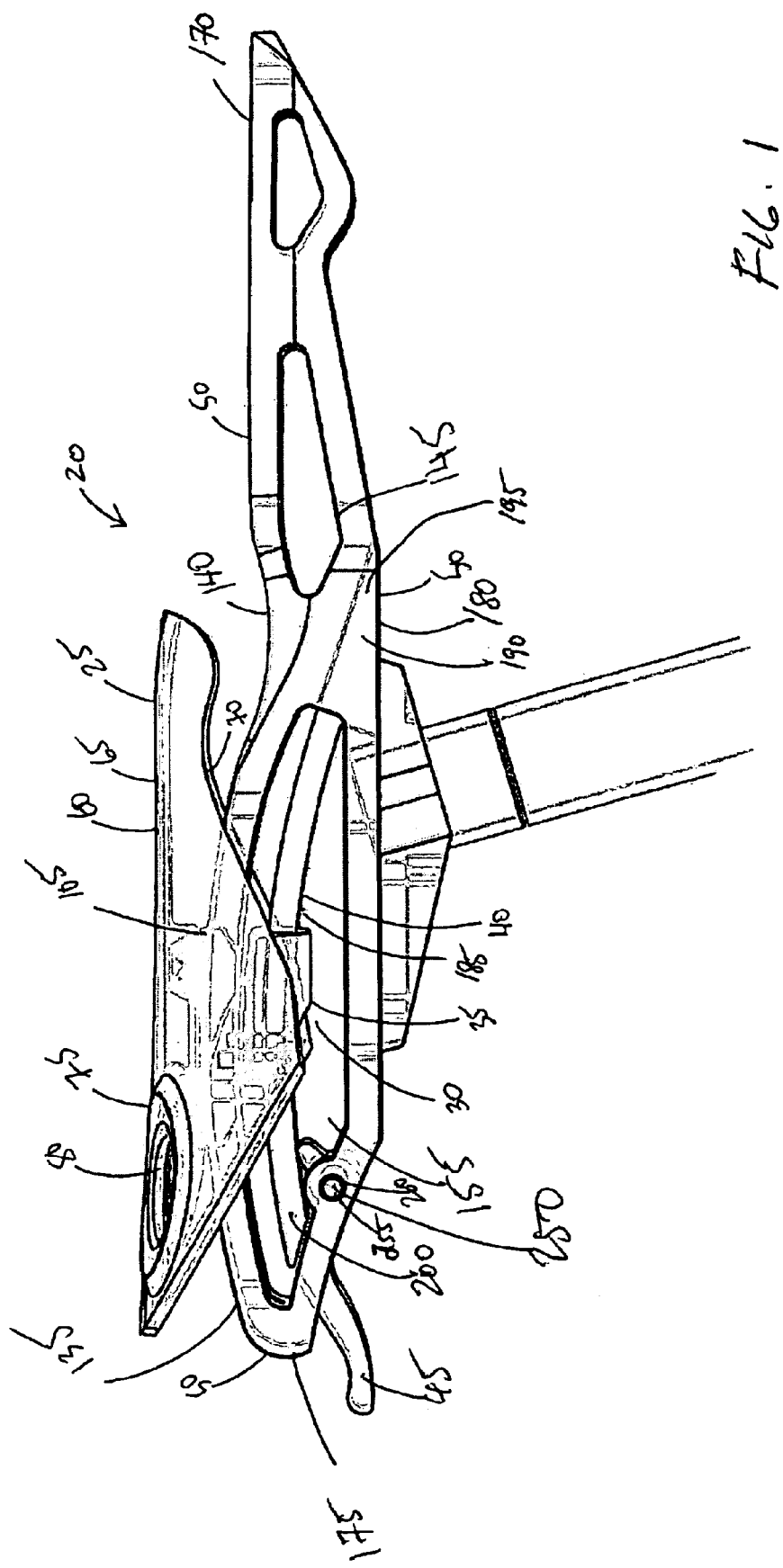
FIG. 1 is an overview of one embodiment of the claimed invention.

This present invention presents a bicycle seat 20 that allows for both angular and longitudinal (front to back) adjustment while the user is using the bicycle seat 20 and that allows for one hand adjustment. This device is unique because it allows for easy one hand adjustment from a locked first position 235 to an unlocked second position 240 and then back to a locked position, which may be at a different location from the first locked position. The seat allows for multiple positions (longitudinally and angularly) that enable a rider to achieve a custom fit to his or her anatomy and riding conditions. For example, the rider can have the seat placed at the furthest rear position for climbing hills, and with an easy adjustment of the invention, the rider can release the locking system 30 with the release lever 45 with one hand and slide the seat 25 forward for a more comfortable and efficient seating posture for power clip and/or flat-surface riding.

Also, this invention better allows for the adjustability of a bicycle seat 20 for users of different shapes and sizes, for example girth, width, and leg lengths.

This bicycle seat 20 is composed of three main parts: the contact seat or seat 25, where the rider rests his or her rear anatomy; the adjustable locking system or locking system 30, which is comprised of a friction lock 40, a locking mechanism 35, and a release lever 45; and the boom 50, which provides lateral support for the bicycle seat 20 and houses the locking system 30.

Seat and Bearing Bracket

The seat 20 has at least one seat contact surface 60. As shown in the FIGS. 1-5 and 8-10, the seat has a first seat contact surface 65 and a second seat contact surface 70. The seat 25 may also have at least one seat pad 75, which can be made out of silicone or any cushioning or supportive substance that provides a greater custom and comforting fit. In addition, this at least one seat pad 75 (typically, there are two seat pads—one for each buttock); the seat pad(s) 75 can be interchanged to provide different colors and appearances for the user.

In addition, the seat 25 may also have holes, spaces or voids 80 where the user will place his or her buttocks. These holes 80 should not be so large as to interfere with comfort of the user. These holes 80 allow for reduced weight for the seat 25. Also, these holes 80 also allow for easy insertion of gel seat pads 75. These seat pads 75 can be of varying shapes and sizes and can be made of various cushioning materials and gels. The seat pads 75 can also cover varying areas of the first contact surface 65 of the seat.

This invention provides for many different options and alternatives for placement of seat pads and accessories on this adjustable bicycle seat to maximize the customization of fit for the particular rider not only for fit but also for use. For example, the seat pads 75 may also be integrated into the contact surface 60 of the seat.

Figure 3:
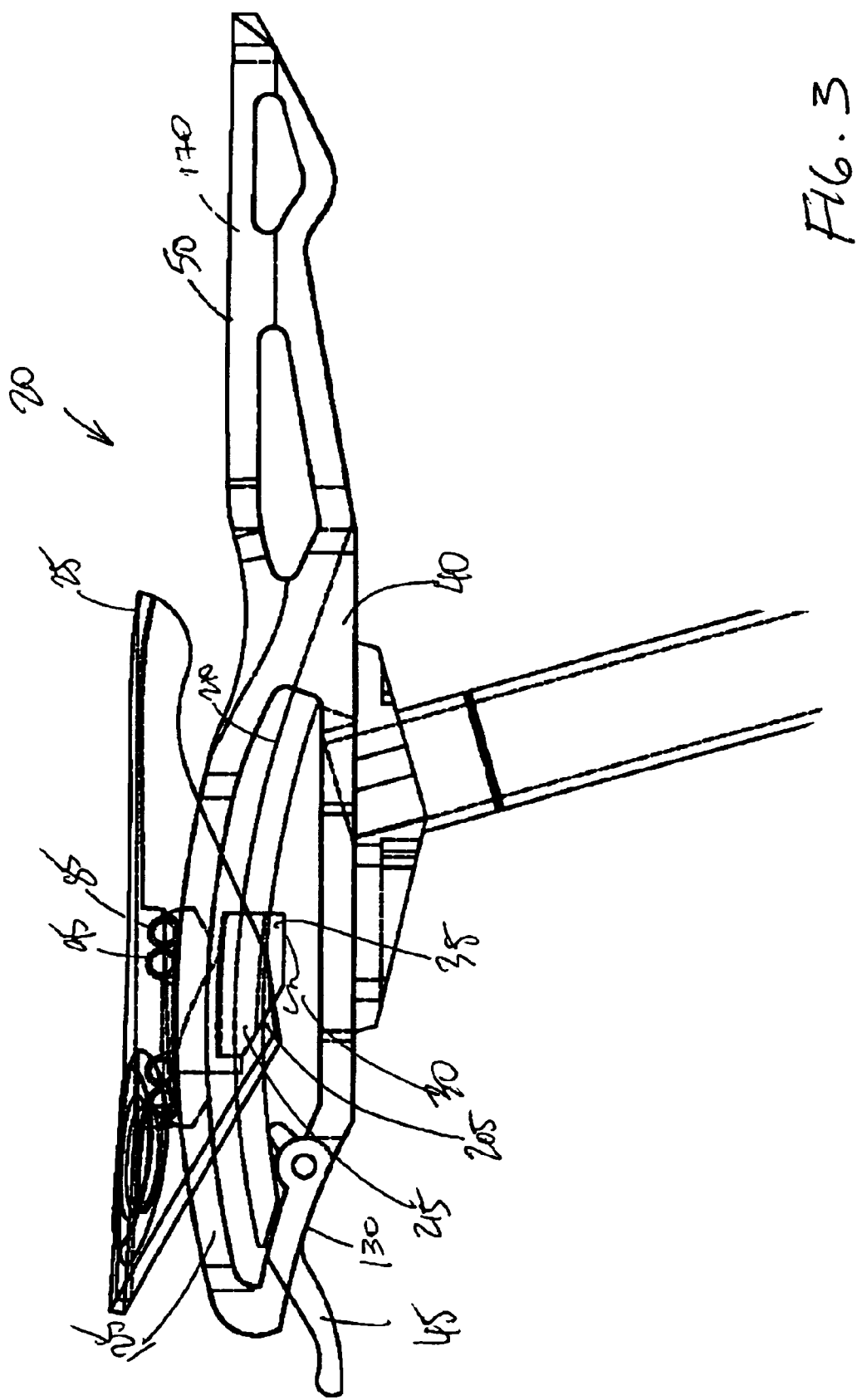
FIG. 3 is another overview of one embodiment of the claimed invention.
Figure 9:
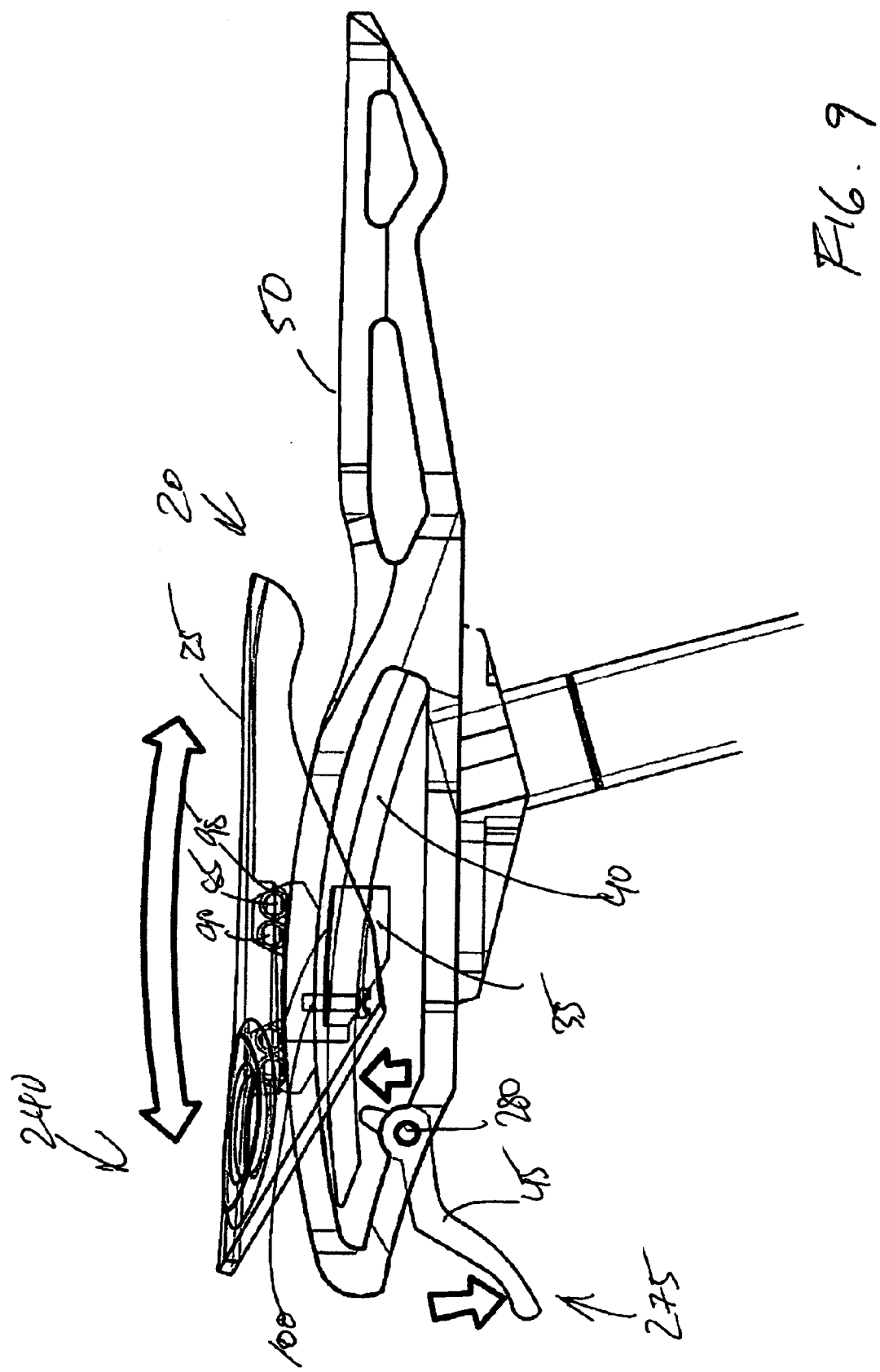
FIG. 9 is a view of one embodiment of the seat invention in the second or unlocked position.

The second seat contact surface 70 may also have at least one mounting 85 or at least one attachment 85 to integrate with a bearing bracket. As shown in FIGS. 3 and 9, this at least one mounting or attachment 85 are mounted to the second seat contact surface 70 and provide a gripping surface to coordinate movement with the bearing bracket 105. In FIGS. 3 and 9, these mountings or attachments 85 are rods, which engage with the bearing bracket 105. The bearing bracket 105 can also be directly integrated into the second seat surface 70 so that the bearing bracket 105 and the seat 25 are one uniform piece as opposed to separate parts. Also, these mountings or attachments 85 can be rods, bars, grips, or any shape objects, which allow the bearing bracket 105 to grip the seat; these mountings or attachments 85 can be glued or be fixedly attached to the second contact surface 70 of the seat.

Additionally, the mountings or attachments 85 can be simple attachment rods with sleeve bearings 95 on the rods. These sleeve bearings 95 will allow for greater fluidity of motion between the seat 25 and the bearing bracket 105. Please note that this is only one type of connection for the slidable interface between the seat 25 and the first channel 125 of the boom; there are other suitable or equivalent connections that would be available to be used in this invention, for example, ball bearing systems.

Figure 2:
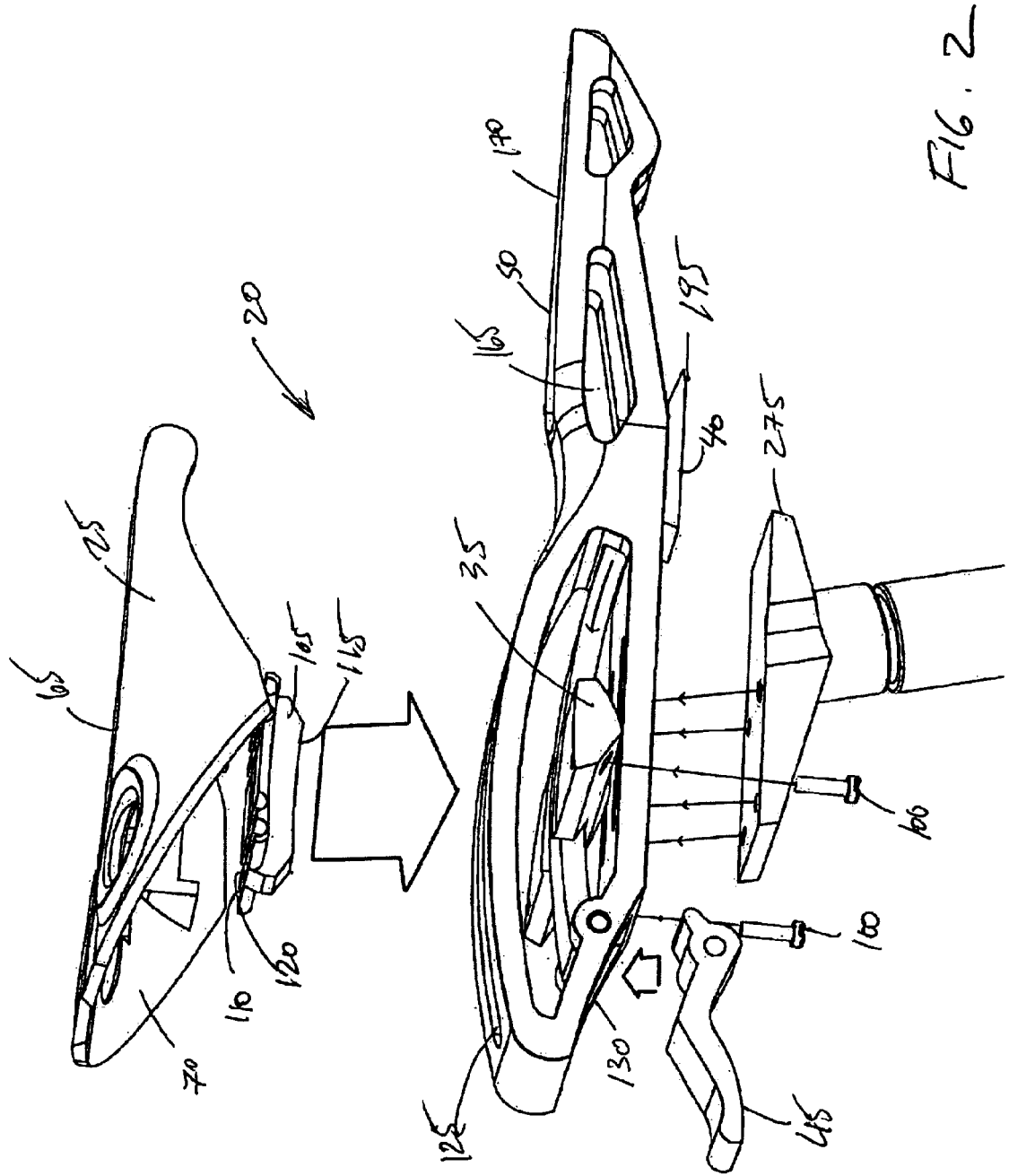
FIG. 2 is an exploded view of one embodiment of the claimed invention.
Figure 4:
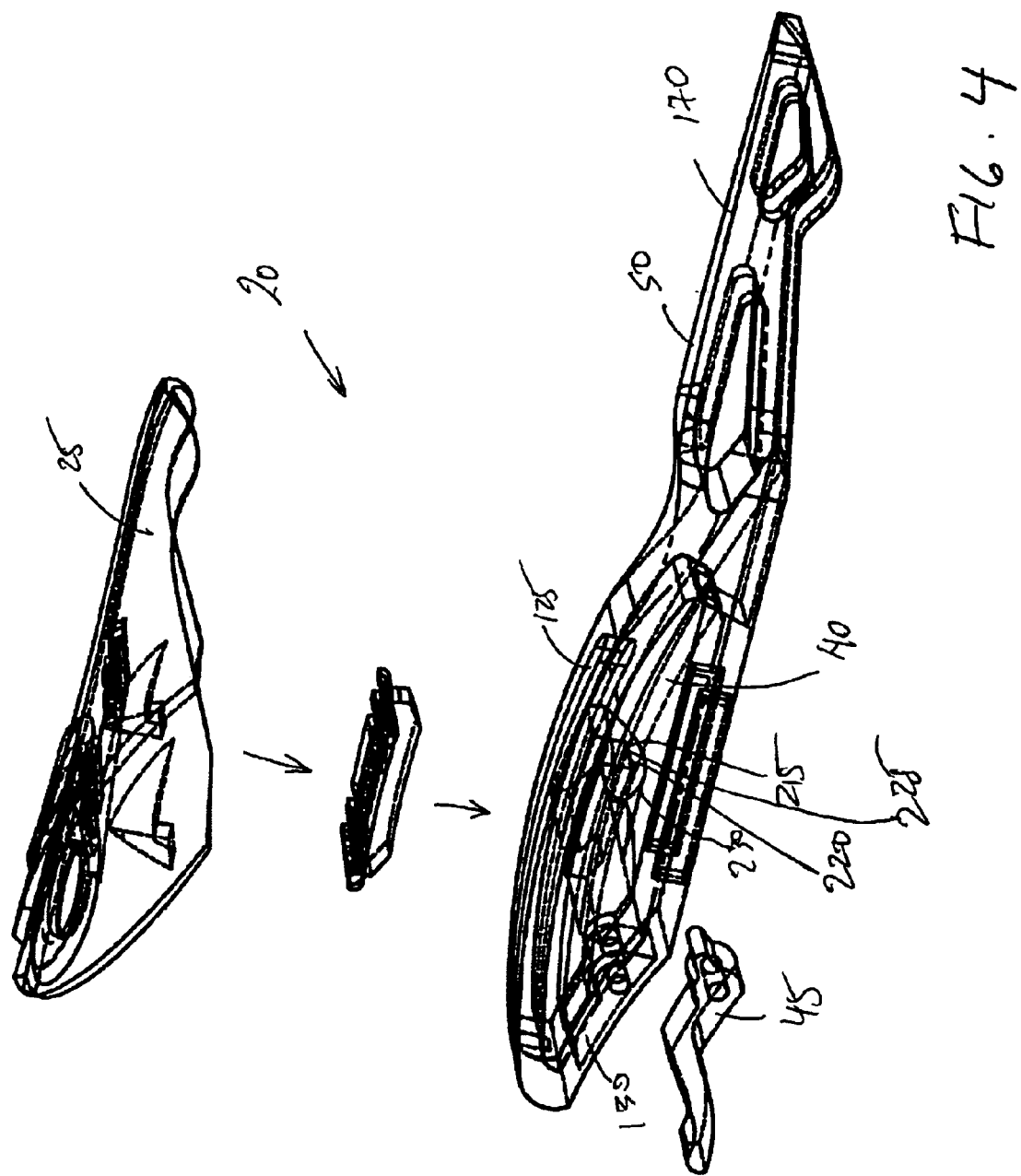
FIG. 4 is another exploded view of one embodiment of the claimed invention.
Figure 5:
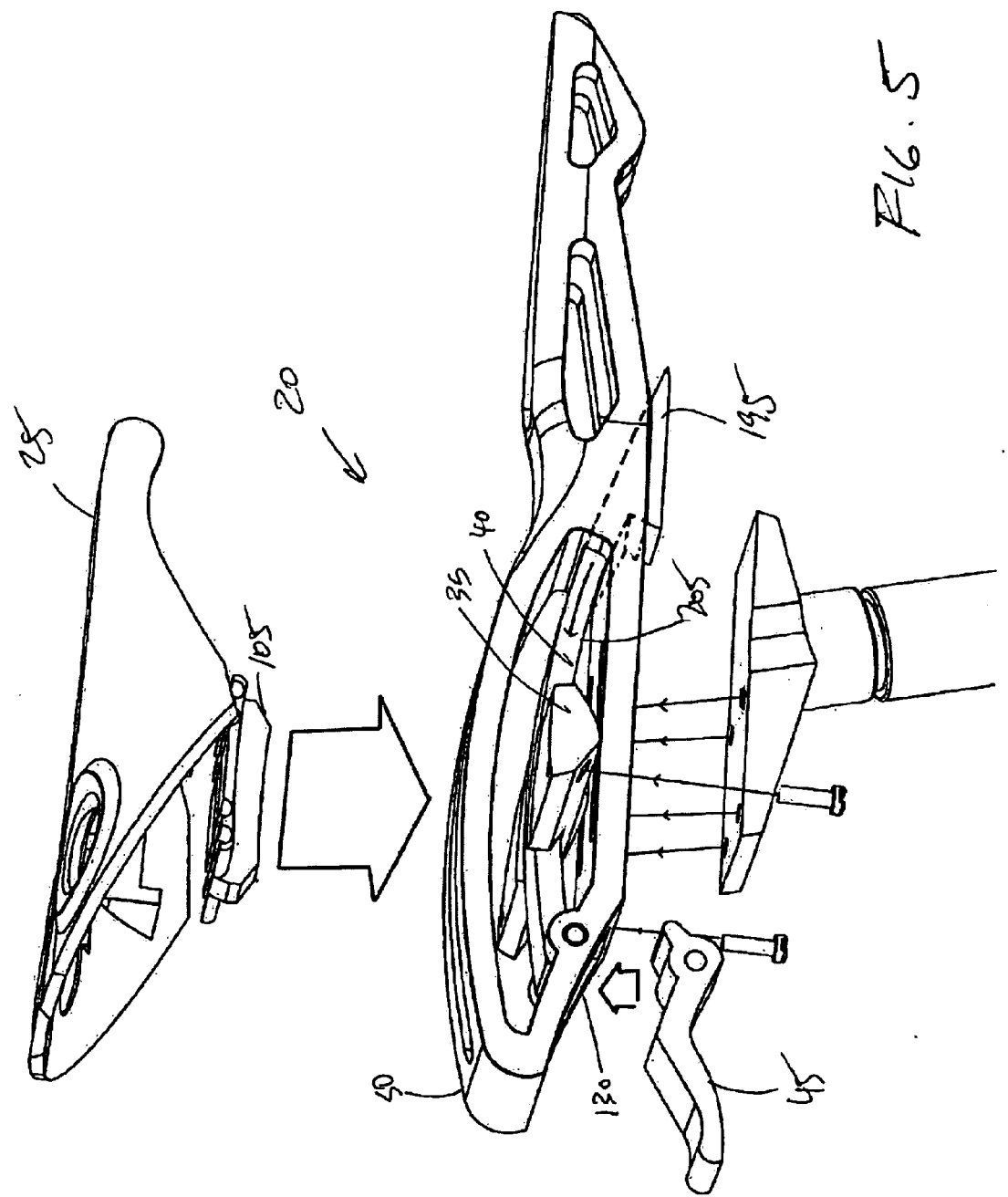
FIG. 5 is another exploded view of one embodiment of the claimed invention.

The bearing bracket 105 has at least one bearing bracket contact surface 110. As shown in FIG. 2, the bearing bracket has a first bearing bracket surface 110, which integrates with the seat, and a second bearing bracket surface 115, which slidably engages with the first channel 125 of the boom. As shown in FIGS. 2, 4, and 5, the first bearing bracket surface 110 has receptacles 120 to receive the mounting or attachments 85 on the seat 25. These bearing bracket surface receptacles 120 allow the seat mounting or attachments 85 to grip the bearing bracket surface or the first bearing bracket surface 110.

There does not need to be a fixed attachment between the bearing bracket and the seat because the seat 25 will be fixedly attached to the locking mechanism 35; the area of the boom (first boom channel) and the friction lock 40 will be sandwiched and in between the locking mechanism 35 and the seat 25, but this combination of parts (locking mechanism with seat and bearing bracket, friction lock and first boom channel) will still be able to easily move the seat 25 along the longitudinal axis of the boom, when the locking system 30 is not engaged.

The second bearing bracket surface 115 may act as a male piece, which fits within the first channel 125 of the boom, which acts as a female piece. This first channel 125 of the boom may pass through the surface of the boom or may simply be an indentation within the outer or first surface 140 of the boom; this indentation should be able to receive the second bearing bracket surface 115 so that the seat can easily slide along the longitudinal length of the boom and along the first channel 125 of the boom.

When not engaged in the locked position, the bearing bracket 105 allows the contact seat 25 to slide along the length of the first channel 125 of the boom. This contact seat 25 can slide as far forward and backward along the longitudinal axis of the boom 50 and is only limited by the length of the first channel 125 of the boom 50. This first channel 125 can have varying lengths along the longitudinal axis of the boom 50. In other embodiments, the boom can have multiple channels on the same side of the boom.

Boom

As shown in FIGS. 1-11, the boom is long and multi-shaped. The boom provides the body of the bicycle seat 20 and acts as the housing for the locking system 30 and the platform for the sliding seat 25. The boom also provides lateral support for this bicycle seat invention.

The boom has at least one boom surface; as shown in the FIGS. 1-5, the boom has a first boom surface (outer) 140 and a second boom surface (inner) 145. The first or outer boom surface 140 serves as a connection surface for the static seat post or seat post 275 and for slidable integration with the bearing bracket 105 and seat 25. The boom 50 is fixedly connected to the static seat post 275 with screws, bolts, glues, or other connection devices or methods. Please note that the boom and the entire adjustable bicycle seat can be removed from the seat post when required by the user for maintenance.

Depending on the particular embodiment, both the first or outer boom surface 140 and the second or inner boom surface 145 can act as a contact surface with part of the locking system 30 (the spring hinge on the friction lock). It is also possible to have the spring hinge 195 be fixedly or securely connected (or alternatively by other fasteners such screws, bolts, nails, rivets, welds, or actual integration with the boom) to the boom 50 or to the seat post 275.

The boom 50 has a first boom channel 125, which allows for slidable connection with the bearing bracket 105 and the seat 25, and at least one boom cavity 155. The first boom channel 125 arises from the first or outer contact boom surface 140 and is located opposite to where the boom mounts to the seat post 275.

As shown in FIGS. 1-5, the boom has several cavities and spaces within the body of the boom. The boom can have multiple cavities, but there must be at least one cavity to house the locking system 30. For example, in FIGS. 1-5, there is a first boom cavity 155, which houses the locking system 30, and a second boom cavity 160 and third boom cavity 165. The extra or multiple cavities in the boom 50 allow for reducing the weight of the seat 25 and to allow for adding interchangeable aftermarket inserts. For example, the third cavity 165 of the boom 50 can be covered to allow for better aerodynamics and to provide a smooth surface to avoid any possible interference with the rider or any other object, such as clothing, handles, or straps. The boom 50 provides lateral support for the seat, but the boom's cavities also allow for aesthetic customization with aftermarket inserts for branding or for advertising of names, brands or teams logos.

In addition, the boom 50 can have more than one boom channel. As shown in FIGS. 1-5, the boom 50 has a first or anterior end 170 and a second or posterior end 175. There is a second boom channel 130, which is located at the second or posterior end of the boom 175; this second boom channel 130 allows a release lever 45 access to the locking system 30 (specifically, the friction lock).

Also, the boom 50 may also have another cavity or another channel to act as a female unit or receptacle and a grasping point for the spring hinge of the friction lock, as shown in FIGS. 1-5.

In addition, in another embodiment, this invention allows for a leaf spring or a pivot point. Instead of a spring hinge, the invention also allows for pivot and/or leaf spring to pivot about a point on the boom such that the boom acts as an anchor for one side of the leaf spring.

Locking System

The locking system 30, which rests within a cavity 155 of the boom 50, comprises a locking mechanism 35, a friction lock 40, and a release lever 45.

Friction Lock

Within the first cavity 155 of the boom 50, the friction lock 40 rests within a channel space 215 or receptacle space 215 of the locking mechanism 35. The friction lock 40 is typically made of a material, including but not limited to titanium or titanium alloy, which allows for a certain level of flexibility or give to allow friction between the locking mechanism contact surface 225 and the contact surface 185 of the friction lock to hold the locking system together.

The friction lock 40 can be long and angular shaped. The shape of both the friction lock 40 and the first boom channel 125 is not required to be angular or curved and can be straight, but it helps to be angular and to coincide with shape with the first channel of the boom so that the locking system 30 can coincide with the travel path of the seat along the longitudinal length of the boom 50, when the locking system 30 is disengaged and unlocked. In addition, if the shape of the friction lock 40 and the first boom channel 125 are angular and/or curved and consistent with each other, this angular or curved shape allows the user to not only adjust the longitudinal placement of the seat, but also the angular placement of the seat 25 in one easy motion.

The friction lock 40 has a first friction lock end 190 and a second friction lock end 200. The first friction lock end 190 has a spring hinge or hinge spring 195 as shown in FIGS. 1-5. This hinge spring 195 has a built in hinge to grasp the boom surface. This hinge shape has severe edges for grasping a corner surface created from a channel or opening in the boom 50.

The spring hinge 195 is not limited to one shape, but it may be able to securely grasp or be fastened to the boom 50 to provide an anchor so that the second friction lock end 200 can have some flex and work in conjunction with the release lever and work in conjunction with the locking mechanism (bottom surface of the friction lock can work with the locking mechanism). In other embodiments, the spring hinge 195 and the friction lock 40 are securely fastened to the boom 50.

In addition, in other embodiments, the first friction lock end 190 or other pivot devices or leaf springs can be bolted, screwed, or fixedly attached to the boom or even possibly the seat post or seat post mounting. Also, the first friction lock end 190 or other pivot devices or leaf spring ends can be integrated into the boom 50 itself.

The friction lock has at least one contact surface 185; in FIGS. 1-7, there is a first friction lock surface 205 and a second friction lock surface 210. The first friction lock surface 205 contacts and engages the contact surface 220 of the locking mechanism to cause a meeting and an engagement that is based on friction. This friction prevents the seat 25 from moving.

Also, instead of using a spring hinge 195, this invention can also use a leaf spring. A first end of the leaf spring would be fixedly mounted or attached to the boom (either the first or second surface of the boom; a second end of the leaf spring would mimic the size and angular shape of the friction lock. The leaf spring would also contact the locking mechanism to create friction, which would prevent the seat from moving from a locked position until released by the releasing layer.

In another embodiment of the invention, the locking system could employ a pivot point instead of a spring hinge for the friction lock. A first end of the friction lock could be fixedly secured to the boom such that the friction lock would act like a spring within in the boom cavity. This friction lock with a pivot point would also contact the locking mechanism surface to form a frictional contact to prevent the seat from moving until release lever is activated.

In many of the above embodiments, there is frictional engagement between the contact surface of the friction lock and the contact surface of the locking mechanism. This friction prevents the seat from moving until the user releases the release lever.

Locking Mechanism

A Locking mechanism 35 works in conjunction with the friction lock 40 and the release lever 45. The shape of the locking mechanism 35 is not limiting and can be a multitude of different shapes, but the locking mechanism 35 should have at least one locking mechanism surface 220 to fixedly connect with the second contact surface 70 of the seat (i.e. the bottom side of the seat and opposite to the side where the user rests his or her rear anatomy) and to receive the friction lock and to create a frictional contact with the contact surface of the friction lock. Also, as shown in FIGS. 1-11, the locking mechanism 35 should be of dimensions to not interfere with the legs of the rider or user when pedaling. In addition, the locking mechanism 35 may contact the second contact surface 70 of the seat 25 at the peripheral edges of the second contact surface because the center portion of the second contact surface of the seat would be for integration with the bearing bracket.

Figure 6:
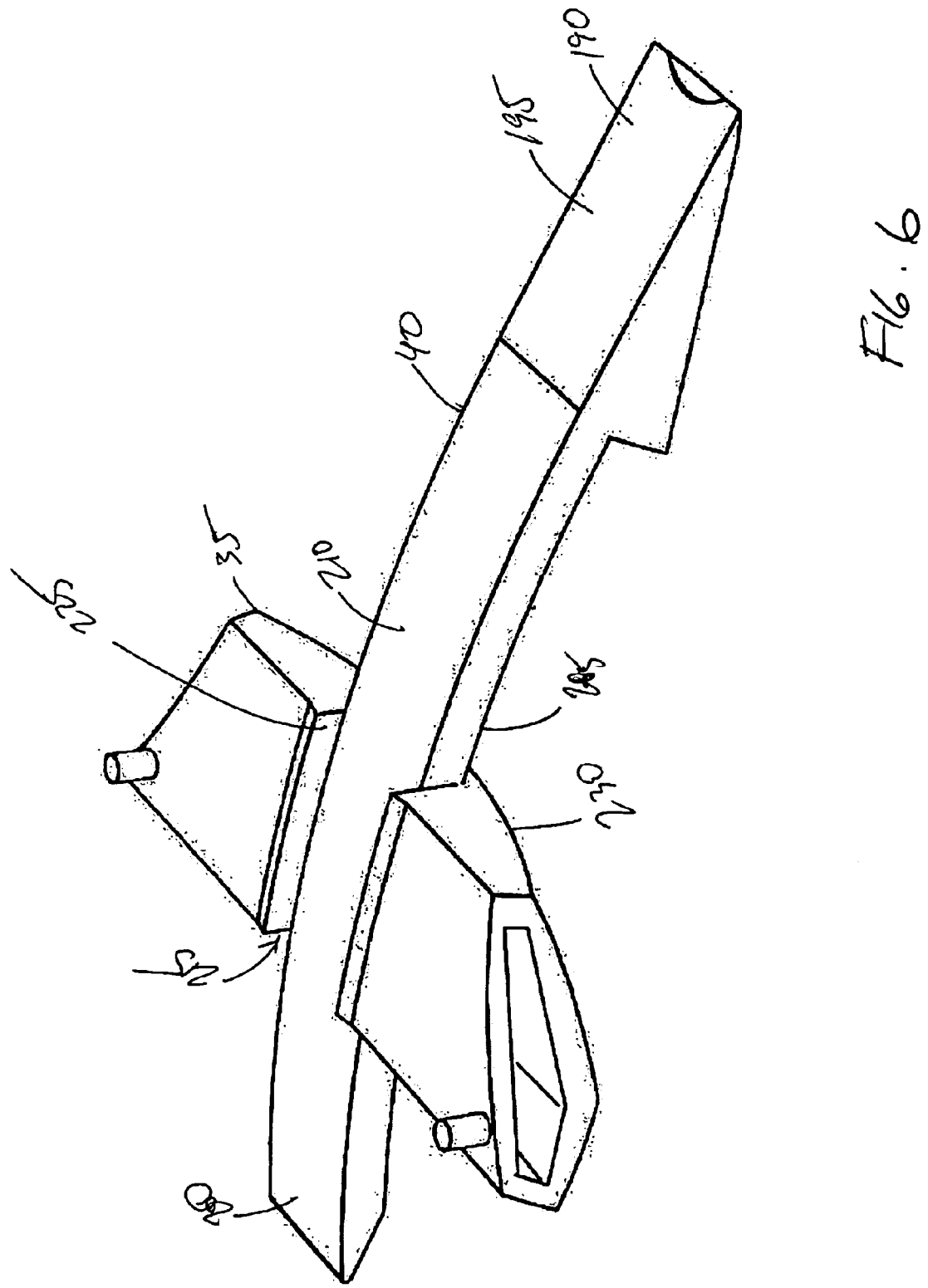
FIG. 6 is a view of how the locking mechanism and the friction lock frictionally engage each other.
Figure 7:
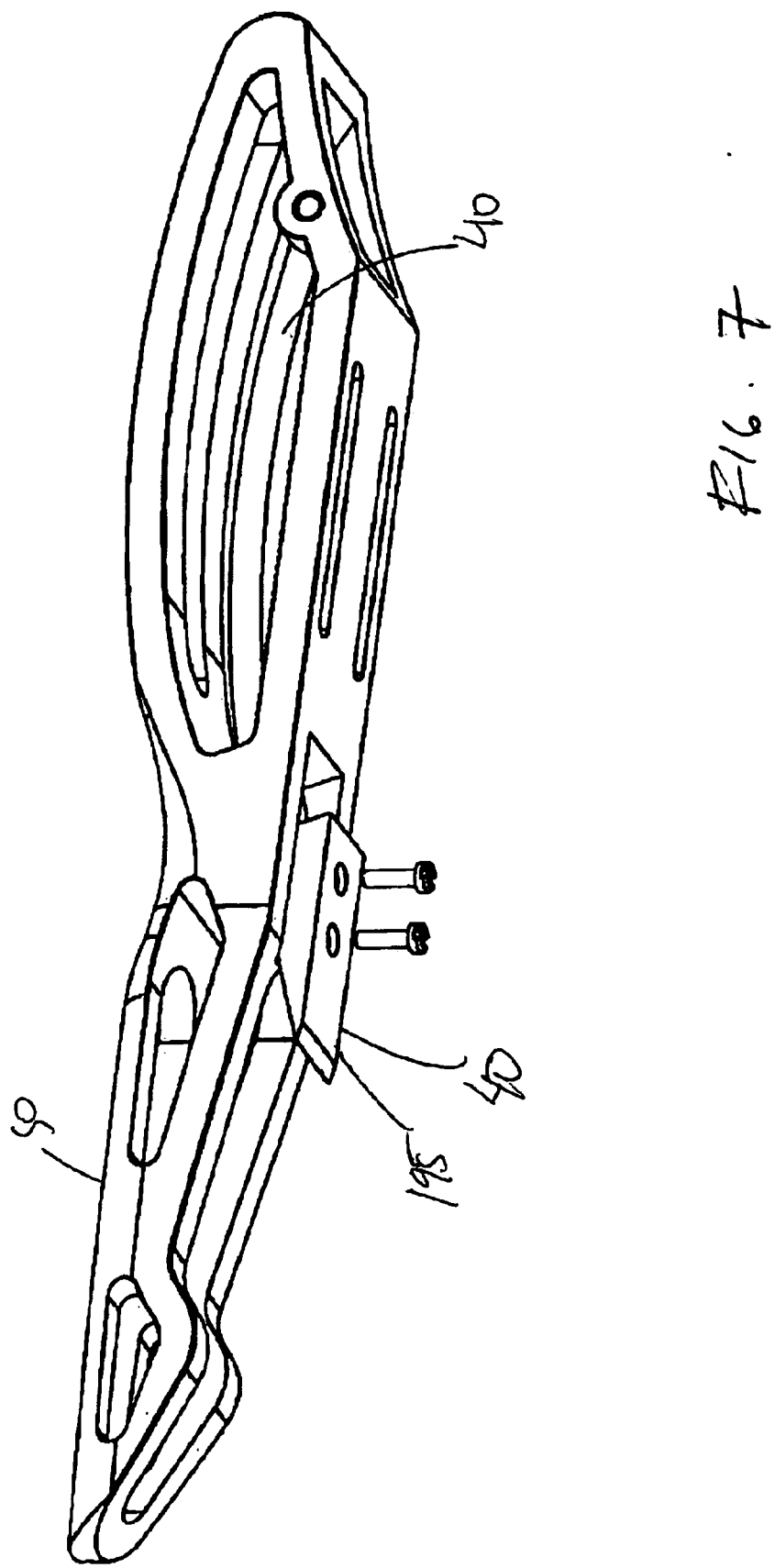
FIG. 7 is a view of the boom and the friction lock.
Figure 8:
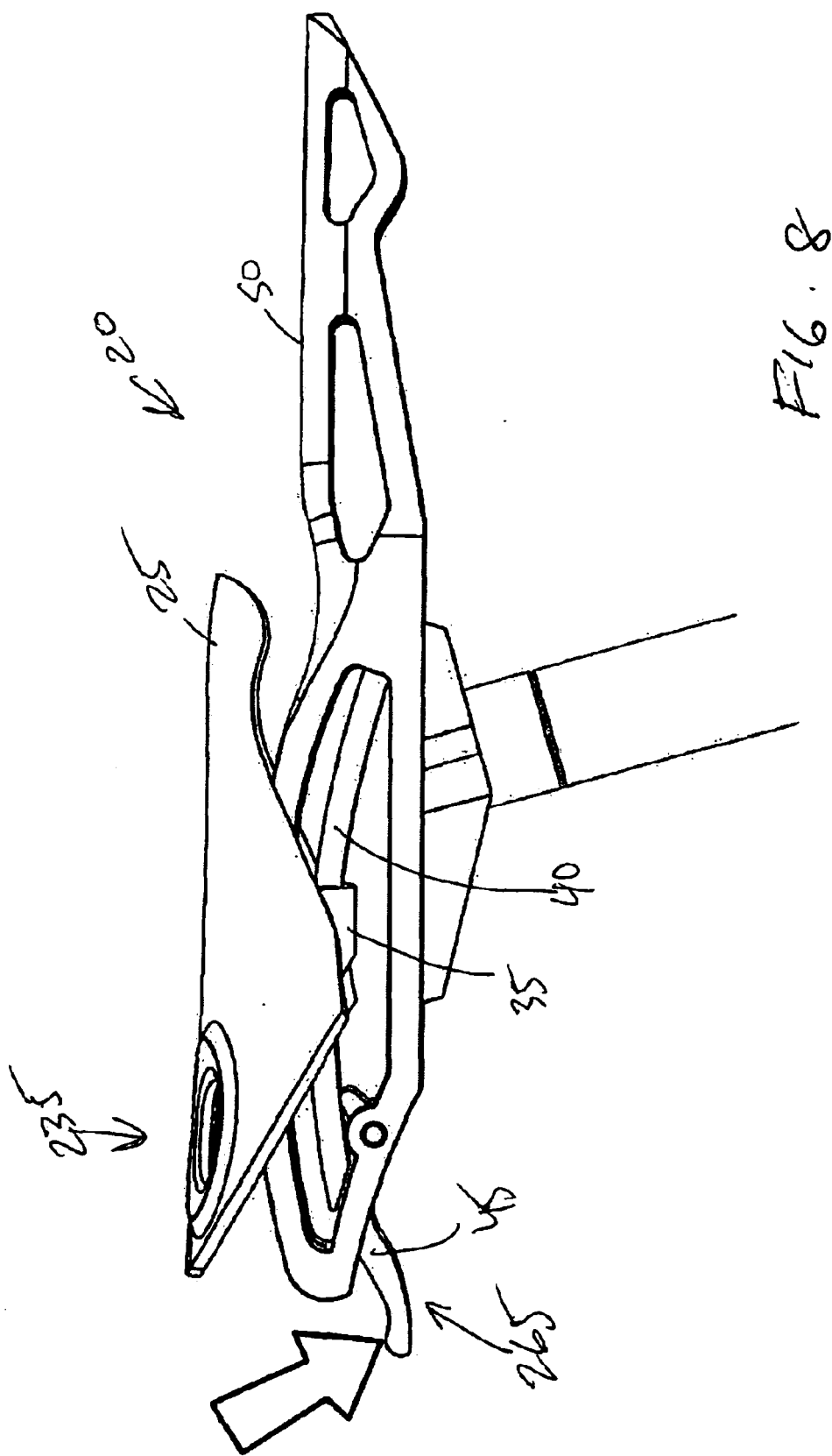
FIG. 8 is a view of one embodiment of the seat invention in the first or locked position.

The locking mechanism 35 also can be partially hollow as shown in FIG. 6, in order to save weight.

As shown in FIGS. 1-7, there is a first locking mechanism surface 220 to fixedly connect with the seat 25 and a second locking mechanism surface 230 to contact and to receive the friction lock 40. The seat 25 can be fixedly connected to the locking mechanism 35 with screws, bolts, welding, glues, or other secure connection devices.

In FIG. 6, the second locking mechanism surface creates a channel or a receptacle space 215 to receive the friction lock 40. This frictional connection between the locking mechanism 35 and the friction lock 40 must enable the locking mechanism 35, when securely fastened to the seat 25 and when the friction lock's spring hinge 195 engages the boom 50, to apply a force opposite to the natural force or tendency of the friction lock 40. The friction lock 40 normally wants to be a position lower than the locking mechanism 35 or to go in an opposite direction to the locking mechanism 35. When the friction lock 40 rests within the channel of the locking mechanism, the friction lock 40 is impeded from going lower than the locking mechanism 35. This interaction between the contact surfaces 185, 220 of the friction lock and the locking mechanism relies on friction to provide the stopping force from the seat from moving from a first seat position (locked) 235 to a second seat position (unlocked) 240.

Release Lever

The locking system has a release lever 45. This release lever 45 has access to the locking system 30 through the second boom channel 130, located in the second or posterior boom end 175. This release lever 45 can be mounted to the boom 50 with an axle 280. This release lever axle connects through a release lever pivot point and through a boom pivot point. The release lever 45 can be pivotally mounted to the boom 50.

The release lever 45 shape can vary, but as shown in FIGS. 1-5, the release lever 45 should be easy for the user to grasp with one hand while using the seat and during riding. The release lever 45 has a first release lever position 265 and a second release lever position 270. Once the user pushes down or applies a releasing force on the release lever 45, the locking system 30 will release, and once the user releases downward pressure or force or relinquishes said releasing force on the release lever 45, the release lever 45 will return to its first release lever position 265.

In the first release lever position 265, the release lever 45 either does not contact the friction lock 40 or does not provide an upward force, which is an opposite force to the natural tendency of the friction lock surface 185 to be at a lower level than the contact surface 220 of the locking mechanism 35. When the user applies a releasing force on the release lever, the release lever 45 is moved to a second release lever position 270 and applies an upward or opposite force to the friction lock 40, which allows the contact surface 185 of the friction lock to disengage from the locking mechanism 35 and the locking mechanism 35 to disengage from the friction lock 40 to allow the seat to move along the angular path or longitudinal path (either backwards and forwards) along the first channel 125 of the boom.

This adjustable bicycle seat can assume a myriad of different combinations of longitudinal and angular positions and adjustments from a first locked position to a second unlocked position to a third locked position. These adjustments can be made while the using the adjustable bicycle seat on a cycle-type apparatus, typically a bicycle. Also, the user can make these adjustments with only one hand as he or she is riding. This is very useful because another hand typically needs to be held on to the handlebars of the bicycle and/or vehicle during operation.

Further, because this adjustment can be make on the fly or during riding the bicycle and/or vehicle, the user can adapt the bicycle seat quickly to different riding conditions and to make a smooth transition to the optimal riding position so that the rider can achieve the most efficient use of his or her body as the engine of the bicycle and/or vehicle.

Method of Using the Invention

After the adjustable bicycle seat is properly mounted on a seat post or a static seat post and placed with a cycle-type apparatus, such as a bicycle, the rider (male or female) would reach for the release lever and apply a force to release the frictional engagement of the locking system (the frictional engagement or "lock" between the locking mechanism contact surface and the friction lock contact surface), so that the seat is able to be adjusted. The user will apply pressure with his or her rear anatomy to move the seat to its desired position and based on the road conditions and needs. The user can tailor the fit and location of the seat, angularly and longitudinally, to the type of riding conditions and to the type of body style of the rider. This adjustment can be made with only one hand and while the rider is using the cycle-apparatus.

In detail, when the user applies pressure to the releasing lever to overcome the friction holding the locking system (the contact surface of the locking mechanism and the contact surface of the frictional lock or any other of the locking systems, including leaf springs, gears, or teeth as described above), the friction lock is pushed in the direction of the first boom channel and away from the lock mechanism. Then, the seat is in a free position so that the user can slide the seat to the desired position along the length of the first boom channel and while the user continues to apply pressure on the release lever. Once the desired position is selected, the user will release or relinquish the pressure on the release lever and the locking system will reengage. The contact surfaces of the friction lock and the locking mechanism will contact to form a frictional engagement to lock the seat into place. Also, once the user releases pressure on the release lever, the release lever can move back to its original locked position. It is also contemplated that the release lever can be engineered so that the user must return the release lever back to the original locked position.

Figure 10:
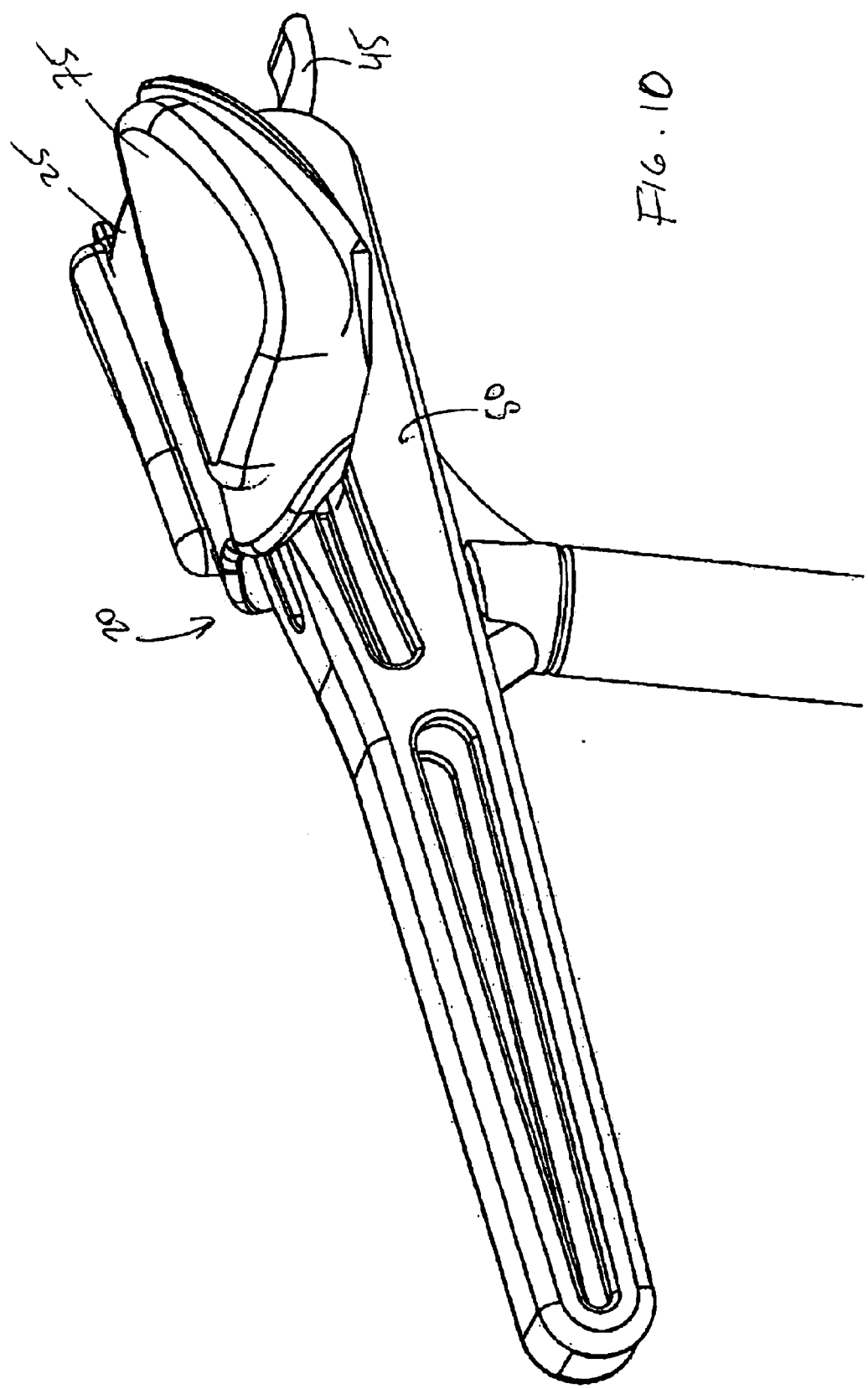
FIG. 10 is view of one alternative embodiment of the claimed invention.

As shown in FIG. 10, the boom can be of many different shapes, including straight or curved. By allowing a curve into the longitudinal axis of the boom, this invention allows for both angular and longitudinal (front to back and back to front) adjustment of the bicycle seat with one simple and elegant motion. Typically, this boom curve mimics the shape and curve into the friction lock and the travel of the boom's first channel.

Alternate Position for Release Lever

Figure 11:
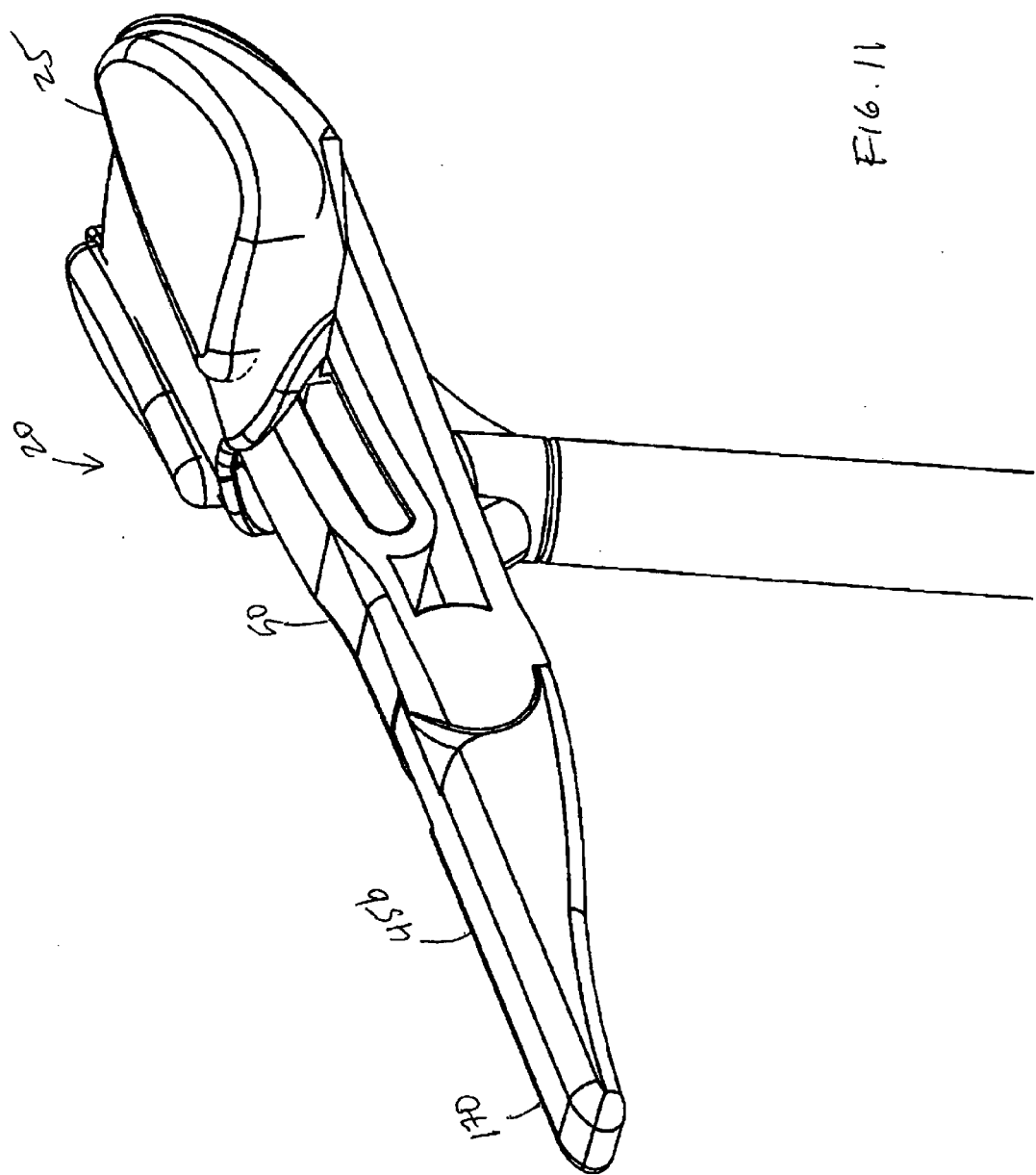
FIG. 11 is a view of another alternative embodiment.
Figure 12:
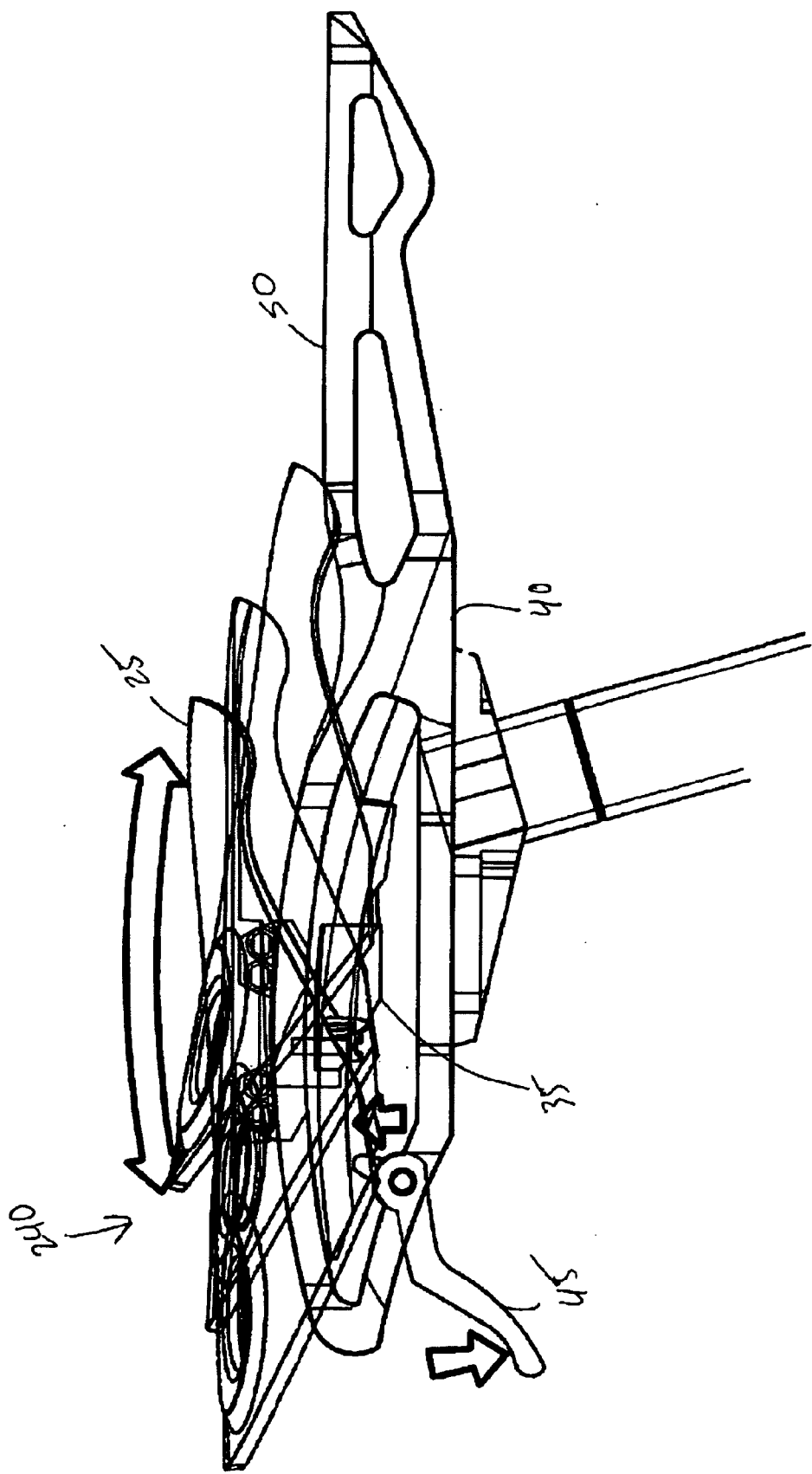
FIG. 12 is another view of the seat invention in the second or unlocked position.

In another embodiment, as shown in FIG. 11, the invention can have a release lever 45b located in a different part of the boom. FIG. 11 shows the release lever 45b located at the first end 170 of the boom. This lever can use a similar locking system as described above, but in addition there can also be used a gear or teeth mechanism, which would push a wedge or piston and/or gears or teeth out of a locked first position to allow the seat to move in an unlocked second position. As a result, the release lever would have two positions—a first or locked position and a second or unlocked position. When the user applies a releasing force on the releasing lever, the releasing lever would reposition a wedge, piston/gears, or teeth out of the way to unlock the locking system and to allow the seat to move along the longitudinal axis of the boom. When the user relinquishes or stops applying the releasing pressure to the release lever, the wedge would spring back into place and lock the seat into the first locked position and the releasing lever would return to its first locked position. In addition, the release lever 45b would have a pivot point 285 in a location on the boom in between the first and second ends of the boom.

Materials

The seat can be made of carbon fiber or other lightweight composite materials or plastics. The boom, locking mechanism, friction lock, and release lever can be made of lightweight metal or titanium. The important part of the material for the friction lock is to allow for some flexibility or "give" so that the locking mechanism to work properly using friction.

Please note that while the best mode employs a friction in the locking mechanism, the invention can also use other locking and unlocking mechanisms including but not limited to teeth and gears and other adjustable locking mechanisms.

This invention was mainly intended for bicycles, but this invention can also be applied other cycle-type apparatus such as tricycles and other multi-wheeled vehicles—human or motor or battery powered.

While the invention as described above in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

I claim:

1. A longitudinally and angularly adjustable bicycle seat supported on a seat post comprising:

a seat having at least one seat contact surface;

said at least one seat contact surface engaging a bearing bracket;

said bearing bracket further slidably engaging a channel of a boom;

said at least one seat contact surface being fixedly attached to a locking mechanism;

said locking mechanism frictionally engaging a friction lock within said boom;

said friction lock securely attached to said boom;

said locking mechanism and said seat providing an opposite force to said friction lock;

a releasing lever pivotally mounted to said boom;

said boom securely attached to said seat post;

whereby said locking mechanism and said friction lock are frictionally engaged so that said seat is in a first locked position until a user applies a releasing force to said releasing lever to overcome said frictional force between said friction lock and said locking mechanism to allow said seat to move to at least one second unlocked position;

whereby said user relinquishes said releasing force to said releasing lever and said friction lock and said locking mechanism frictionally engages and prevent said seat from moving.

2. The bicycle seat of claim 1 wherein said friction lock is integrated into said boom.

3. The bicycle seat of claim 1 wherein said bearing bracket is integrated into said seat contact surface.

4. The bicycle seat of claim 1 wherein said locking mechanism has at least one locking mechanism contact surface;

said friction lock has at least one friction lock contact surface;

whereby at said first locked seat position, said at least one locking mechanism contact surface and said at least one friction lock contact surface engage frictionally so that said seat does not move.

5. The adjustable bicycle seat of claim 1 wherein said seat is fixably attached to said locking mechanism with at least one screw.

6. The bicycle seat of claim 1 wherein said seat has at least one hole.

7. The bicycle seat of claim 1 wherein said at least one contact surface of said seat has at least one seat pad.

* * * * *